(12) United States Patent
Ausserlechner

(10) Patent No.: US 10,704,925 B2
(45) Date of Patent: Jul. 7, 2020

(54) SENSOR AND METHOD FOR DETERMINING ANGULAR POSITION INCLUDING MEASURING MAGNETIC FIELD LINES AT A DISTANCE GREATER THAN THE INNER RADIUS AND LESS THAN THE OUTER RADIUS OF A RING MAGNET, AND AT A DISTANCE GREATER THAN THE OUTER RADIUS OR LESS THAN THE INNER RADIUS

(75) Inventor: Udo Ausserlechner, Villach (AT)

(73) Assignee: Infineon Technologies AG, Neubiberg (DE)

( * ) Notice: Subject to any disclaimer, the term of this patent is extended or adjusted under 35 U.S.C. 154(b) by 1573 days.

(21) Appl. No.: 12/352,119

(22) Filed: Jan. 12, 2009

(65) Prior Publication Data

US 2010/0176804 A1    Jul. 15, 2010

(51) Int. Cl.
| | | |
|---|---|---|
| *G01B 5/14* | (2006.01) |
| *G01D 5/14* | (2006.01) |
| *G01B 7/30* | (2006.01) |
| *G01D 3/028* | (2006.01) |

(52) U.S. Cl.
CPC ............. *G01D 5/145* (2013.01); *G01B 7/30* (2013.01); *G01D 3/028* (2013.01)

(58) Field of Classification Search
CPC .... G01D 5/225; G01D 5/2258; G01D 5/2266; G01D 5/2275; G01D 5/2283; G01D 3/028; G01D 5/2013; G01D 5/202; G01D 5/2026; G01D 5/2033; G01D 5/204; G01D 5/2046; G01D 5/2053; G01D 5/206; G01D 5/22; G01D 5/2208; G01D 5/2216; G01D 5/2225; G01D 5/2233; G01D 5/2241; G01D 5/14; G01D 5/142; G01D 5/145; G01D 5/147; G01D 5/16; G01D 5/20; G01D 5/2006; G01B 7/30; G01B 7/02; G01B 7/023; G01B 7/04; G01B 7/046; G01B 7/14;
(Continued)

(56) References Cited

U.S. PATENT DOCUMENTS

| | | | |
|---|---|---|---|
| 5,789,917 A | 8/1998 | Oudet et al. | |
| 5,898,301 A * | 4/1999 | La Croix et al. | 324/207.22 |
| 6,104,186 A * | 8/2000 | Yamada et al. | 324/207.21 |

(Continued)

FOREIGN PATENT DOCUMENTS

| | | |
|---|---|---|
| DE | 10 2007 011 672 | 6/2008 |
| WO | WO 2007145296 A1 * | 12/2007 |
| WO | WO 2008062778 A1 * | 5/2008 |

OTHER PUBLICATIONS

English machine translation of the description of DE 102007011672, obtained from https://worldwide.espacenet.com/advancedSearch?locale=en_EP, obtained on Nov. 13, 2018.*

*Primary Examiner* — David M. Schindler
(74) *Attorney, Agent, or Firm* — Dicke, Billig & Czaja, PLLC

(57) ABSTRACT

An angle sensor includes a ring magnet adapted to be attached to a rotatable shaft. The ring magnet has an axis of rotation and an inner radius and an outer radius extending from the axis of rotation to define an annulus. A first magnetic sensor is situated proximate the ring magnet to measure magnetic field lines within the annulus, and a second magnetic sensor is situated proximate the ring magnet to measure magnetic field lines outside the annulus.

11 Claims, 4 Drawing Sheets

(58) Field of Classification Search
CPC .......... G01B 7/305; G01B 7/31; G01B 7/312; G01R 15/20; G01R 15/202; G01R 15/205
USPC .................................................. 324/207.25
See application file for complete search history.

(56) References Cited

U.S. PATENT DOCUMENTS

| | | | |
|---|---|---|---|
| 6,163,147 A * | 12/2000 | Peilloud .................. | 324/207.22 |
| 6,356,073 B1 | 3/2002 | Hamaoka et al. | |
| 6,720,763 B1 * | 4/2004 | Nehl et al. ............... | 324/207.25 |
| 7,663,360 B2 | 2/2010 | Matsumoto | |
| 7,911,203 B2 * | 3/2011 | Thomas et al. ............ | 324/207.2 |
| 2002/0145419 A1 * | 10/2002 | Luetzow et al. ......... | 324/207.12 |
| 2003/0205998 A1 * | 11/2003 | Heremans et al. ........... | 324/165 |
| 2004/0164733 A1 * | 8/2004 | Fukaya et al. ............ | 324/207.25 |
| 2005/0007104 A1 * | 1/2005 | Lequesne et al. ........ | 324/207.25 |
| 2005/0193583 A1 * | 9/2005 | Schmied ......................... | 33/605 |
| 2007/0296411 A1 * | 12/2007 | Thomas et al. ............... | 324/251 |
| 2008/0048811 A1 * | 2/2008 | Miyashita et al. ............ | 335/284 |
| 2009/0206827 A1 * | 8/2009 | Aimuta et al. ............ | 324/207.25 |
| 2009/0267594 A1 * | 10/2009 | Kather ..................... | 324/207.25 |
| 2010/0045271 A1 * | 2/2010 | Tanaka et al. ........... | 324/207.25 |
| 2010/0060272 A1 * | 3/2010 | Tanaka et al. ........... | 324/207.25 |
| 2010/0072988 A1 * | 3/2010 | Hammerschmidt et al. ................ 324/207.25 |
| 2010/0141244 A1 * | 6/2010 | Bartos ...................... | G01D 5/12 324/207.21 |
| 2010/0148764 A1 * | 6/2010 | Abe et al. ................ | 324/207.25 |

\* cited by examiner

SENSOR AND METHOD FOR DETERMINING ANGULAR POSITION INCLUDING MEASURING MAGNETIC FIELD LINES AT A DISTANCE GREATER THAN THE INNER RADIUS AND LESS THAN THE OUTER RADIUS OF A RING MAGNET, AND AT A DISTANCE GREATER THAN THE OUTER RADIUS OR LESS THAN THE INNER RADIUS

BACKGROUND

Various systems exist for determining the angular position of a rotating member. In some known systems, a permanent magnet is mounted to or embedded in an end of a rotatable shaft and is centered on the axis of rotation. A magnetic field sensor, such as a Giant Magnetoresistive sensor (GMR), Anisotropic Magnetoresistance (AMR) sensor, Hall-sensor, etc. is positioned so as to sense changes in the magnetic field generated by the magnet in response to its change in angular position as it rotates with the shaft. The resulting output signals generated by the magnetic sensor are indicative of the angular position of the rotating shaft. Some known systems employ a permanent magnet ring attached to the perimeter of the shaft, and the direction of field lines above or beside the magnet is detected by the magnetic field sensor.

However, the magnetic field lines are not straight, which results in an angle error defined as the difference between the magnetic field direction detected by the sensor versus the rotation angle of the shaft. This field error depends on the shape of the magnet and the location of the sensor. The sensor's reading radius is the distance from the sensor to the axis of rotation. At some distances, most of the magnetic field lines cross the sensor at the same angle, and hence, the sensor would see little or no angle error at such a distance. However, in practice magnetic field sensors have position tolerances in the order of 0.1 mm, mainly due to manufacturing inaccuracies during die attach. Therefore the sensors can be misplaced slightly, which in turn can result in angle errors.

Further, known sensors such as the type described above can be sensitive to external magnetic fields. For instance, if a motor is being operated nearby, the magnetic field produced by the motor can be superimposed on the field produced by the magnet attached to the rotating shaft, resulting in angle errors.

SUMMARY

One embodiment of an angle sensor includes a ring magnet adapted to be attached to a rotatable shaft. The ring magnet has an axis of rotation and an inner radius and an outer radius extending from the axis of rotation to define an annulus. A first magnetic sensor is situated proximate the ring magnet to measure magnetic field lines within the annulus, and a second magnetic sensor is situated proximate the ring magnet to measure magnetic field lines outside the annulus.

BRIEF DESCRIPTION OF THE DRAWINGS

Embodiments of the invention are better understood with reference to the following drawings. The elements of the drawings are not necessarily to scale relative to each other. Like reference numerals designate corresponding similar parts.

DETAILED DESCRIPTION

In the following Detailed Description, reference is made to the accompanying drawings, which form a part hereof, and in which is shown by way of illustration specific embodiments in which the invention may be practiced. Regarding embodiments disclosed, the term "exemplary" is merely meant as an example, rather than the best or optimal. In this regard, directional terminology, such as "top," "bottom," "front," "back," "leading," "trailing," etc., is used with reference to the orientation of the Figure(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention. In addition, while a particular feature or aspect of an embodiment may have been disclosed with respect to only one of several implementations, such feature or aspect may be combined with one or more other features or aspects of the other implementations as may be desired and advantageous for any given or particular application. The following detailed description, therefore, is not to be taken in a limiting sense, and the scope of the present invention is defined by the appended claims.

Figure 1:
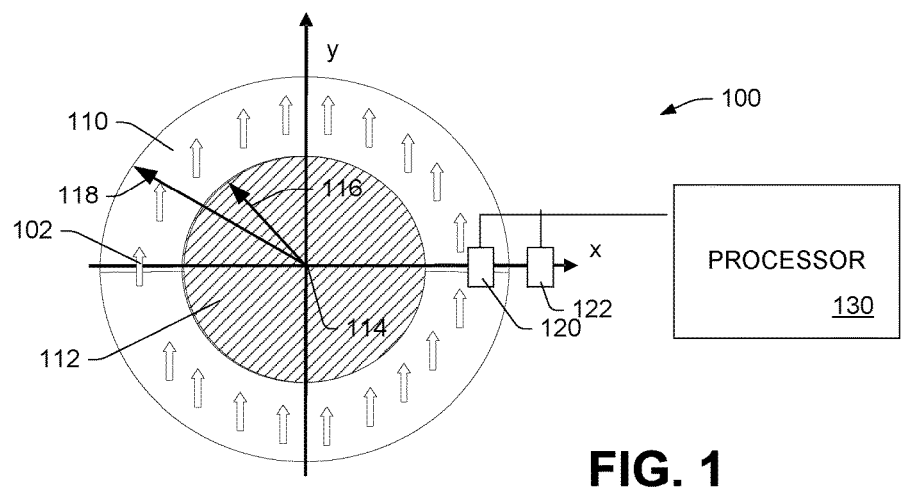
FIG. 1 is a block diagram conceptually illustrating an embodiment of an angle sensing system.

FIG. 1 conceptually illustrates portions of an embodiment of an angle sensor 100. A ring magnet 110 is attached to rotate with a rotatable shaft 112. The magnet 110 has a homogeneous magnetization in the direction indicated by the arrows 102 in FIG. 1. In the illustrated embodiment, this gives a magnetic north pole in the upper part of the magnet 110 (y>0) and a magnetic south pole in the lower part of the magnet 110 (y<0). The magnet 110 rotates about an axis of rotation 114 relative to two stationary magnetic sensors 120, 122 that are situated to measure magnetic field lines generated by the magnet 110. Various types of sensors that measure the direction of the magnetic field lines are suitable for use as the first and second sensors 120, 122, such as MR, AMR, GMR, CMR, or vertical or lateral Hall sensors with or without integrated flux concentrators on the surface of the sensor die.

An inner radius 116 and an outer radius 118 define the ring, or annulus of the magnet 110. The first magnetic sensor 120 is situated proximate the ring magnet 110 to measure magnetic field lines within the annulus of the magnet, while the second magnetic sensor 122 is situated proximate the ring magnet 110 to measure magnetic field lines outside the annulus. In the embodiment illustrated in FIG. 1, the second sensor 122 is situated outside the outer radius 118 of the ring magnet 110.

The magnetic sensors 120, 122 provide respective output signals in response to the sensed magnet field lines that are received by a processing device 130, which determines the angular position of the magnet 104 in response to these signals. In general, the processing device 130 may be implemented by one or more of hardware and/or firmware components, such as a microprocessor, an ASIC (application-specific integrated circuit), a DSP (digital signal processor), etc. together with appropriate memory and other necessary devices. For example, in some embodiments, the processing device 130 includes memory storing look-up tables that correlates magnetic field line angles with angular positions of the magnet 110. In some embodiments, the first and second sensors 120, 122 and the processor 130 are fabricated on a single semiconductor die.

Figure 2:
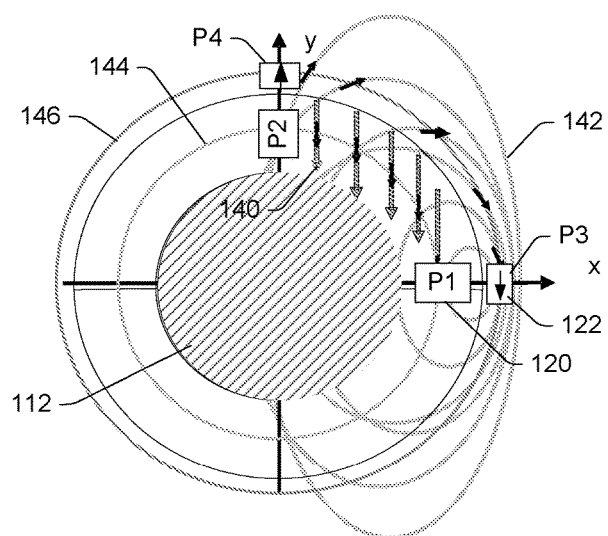
FIG. 2 conceptually illustrates magnetic field lines generated in the embodiment of FIG. 1.

FIG. 2 conceptually illustrates magnetic field lines emanating from the magnet 110. For simplicity, only the flux lines in the first quadrant (x>0 and y>0) and above the magnet 110 are illustrated. Magnetic field lines 140 directly above the magnet 110 are (to a first approximation) anti-parallel to the magnetization direction 102 illustrated in FIG. 1. The magnetic field lines 142 are also above the magnet 110; however, outside the outer perimeter of the magnet 110 the field lines 142 are not straight but rather exhibit a strong curvature.

Thus, as the magnet 110 rotates about the axis of rotation 114 relative to the first and second sensors 120, 122 the direction of the magnetic field lines will differ between the first and second sensors 120, 122. For ease of illustrating this phenomenon, FIG. 2 illustrates different positions of the sensors 120, 122 relative to the ring magnet 110. In reality, however, the magnet 110 rotates with the shaft 112 relative to the sensors 110, 112. Thus, as illustrated in FIG. 2, the first sensor 120 situated between the inner and outer radiuses 116, 118—within the annulus of the magnet 110—moves on a first perimeter 144. The second sensor 122 situated outside the annulus of the magnet 110 (beyond the outer radius 118 in the embodiment illustrated in FIGS. 1 and 2) moves on a second perimeter 146. The direction of the magnetic field lines 140 detected by the first sensor 120 moving along the first perimeter 144 will be vary as compared to the direction of the magnetic field lines 142 detected by the second sensor 122 moving along the second perimeter 146.

Along the first perimeter 144, the direction of the magnetic field lines 140 themselves does not change in the fixed reference frame of the magnet 110 as illustrated in FIG. 2. However, the first sensor 120 detects changing directions of the magnetic field lines 140, because the orientation of the sensor 120 rotates as it moves along the first perimeter 144. Assuming the first sensor 120 detects 0° at a first point P1, at a second point P2 the first sensor 120 has rotated counterclockwise by about 90°. Hence, the first sensor 120 detects −90° at the second point P2. Along the second perimeter 146, the direction of the magnetic field lines 142 is not necessarily the same as the field lines 140 due to the curved nature of the magnetic field lines 142. At a point P3, the magnetic field lines 142 extend in negative y-direction (just as in point P1), so the second sensor 122 also detects 0°. At point P4, the magnetic field lines 142 point in positive y-direction—the magnetic field lines 142 have rotated counterclockwise by 180° from points P3 to P4. Therefore, the second sensor 122 detects +90° at point P4.

Thus, the first sensor 120 positioned at a first reading radius rr1 within the annulus of the magnet 110 detects approximately the negative rotation angle −φ. The second sensor 122 positioned at a second reading radius rr2 outside the annulus (outside the outer radius 118 in FIGS. 1 and 2) detects approximately the positive rotation angle φ.

Figure 3:
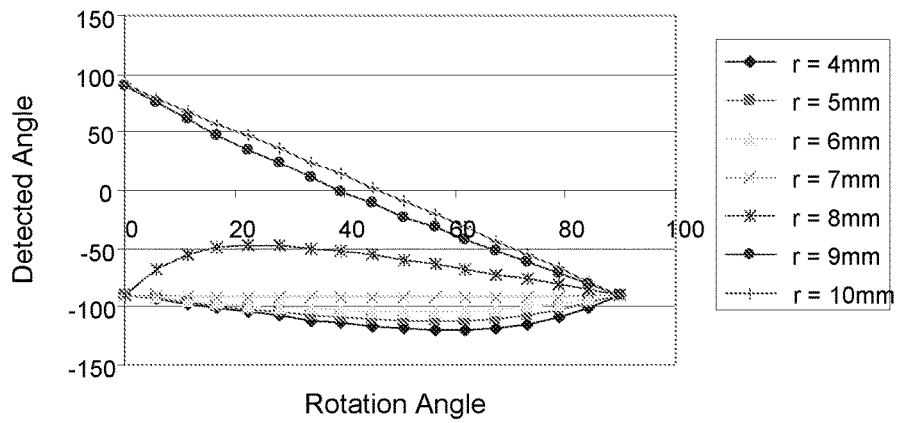
FIG. 3 is a plot of angles sensed by a magnetic field detector at various reading radiuses.

The position detection is "approximate" because, as noted in the background section above, variation in the reading radius can cause significant angle error (larger than 1° in some situations). In one embodiment, the annulus of the ring magnet 110 is defined by an inner radius 116 of 3 mm and an outer radius 118 of 8 mm, and the magnet 110 is 3 mm thick. FIG. 3 is a plot of angles sensed by a magnetic field detector at various reading radiuses. The sample magnetic field is 1T and is sampled 1.5 mm above the magnet 110.

At reading radius r=7 mm (within the annulus of the magnet 110), the curve is fairly straight—all of the detected magnetic field lines cross a circle with this radius at the same angle. Hence, a magnetic field sensor would see little or no angle error at this reading radius. At a reading radius of 10 mm (outside the annulus of the magnet 110), there is also no curvature—there is a linear relationship between the detected angle and the angle of rotation. Thus, for the described angle, these are the two optimum reading radiuses where a magnetic field sensor would have no angle error. The angle of the magnetic field lines (measured in the rotating reference frame of the sensor) is identical to the rotation angle (times +1 or −1 depending on whether the reading radius is within or outside the annulus of the magnet 110.

Figure 4:
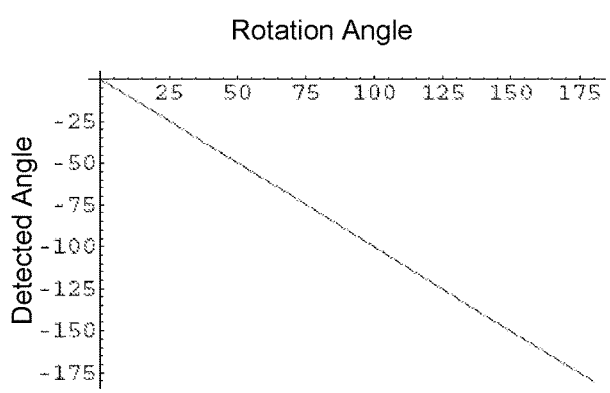
FIG. 4 is a plot illustrating detected angle vs. angle of rotation for a magnetic sensor situated at a reading radius within the annulus of a ring magnet.
Figure 5:
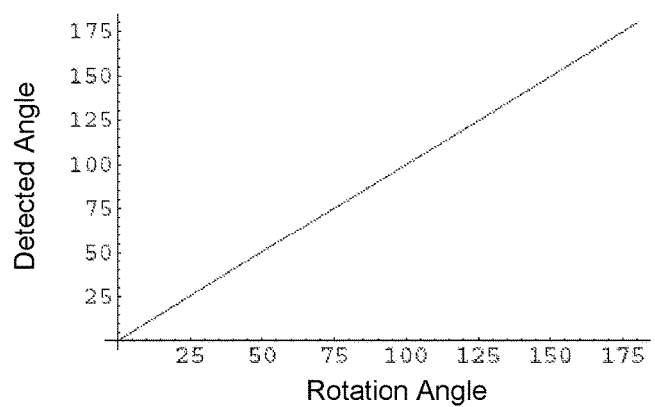
FIG. 5 is a plot illustrating detected angle vs. angle of rotation for a magnetic sensor situated at a reading radius outside the annulus of a ring magnet.
Figure 6:
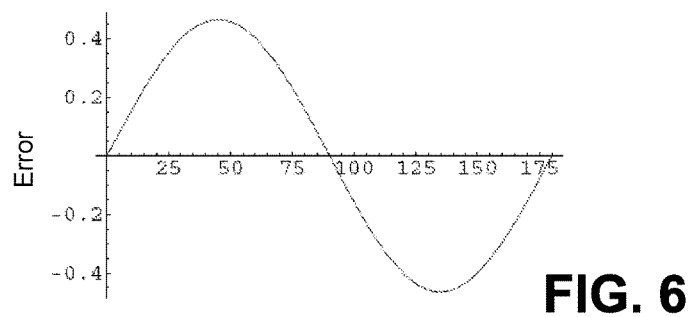
FIG. 6 illustrates the angle error for the magnetic sensor illustrated in FIG. 4.
Figure 7:
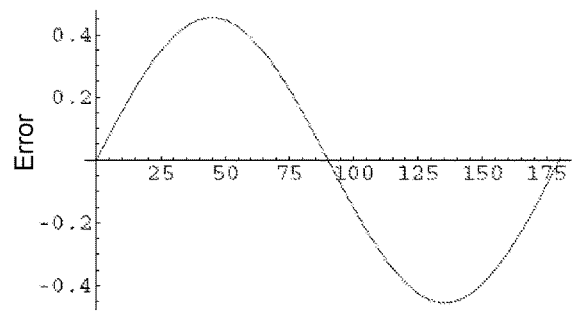
FIG. 7 illustrates the angle error for the magnetic sensor illustrated in FIG. 5.

FIG. 4 is a plot illustrating detected angle vs. angle of rotation for the first sensor 120 situated at about rr1=7.2 mm, and FIG. 5 is a plot illustrating detected angle vs. angle of rotation for the second sensor 122 situated at about rr2=9.2 mm. FIGS. 6 and 7 illustrate the angle errors for the first and second sensors 120, 122, respectively, which was calculated by adding the actual rotation angle to the measured angle for the first sensor 120, and subtracting the actual rotation angle from the measured angle for the second sensor 122.

Figure 8:
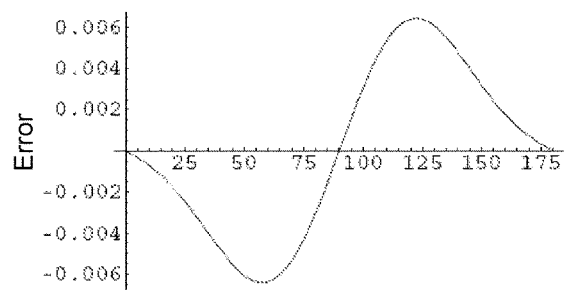
FIG. 8 illustrates the angle error for the averaged measured angles of the sensors illustrated in FIGS. 4-7.

The angle errors for the first and second sensors 120, 122 are similar. If the measured angles of the two sensors 120, 122 are averaged by subtracting the measured angle of the second sensor 122 from the measured angle of the first sensor 120 and dividing the result by 2 gives results very similar to the actual rotation angle. FIG. 8 illustrates the angle error for the averaged measured angles (rotation angle subtracted from the averaged measured angle). As illustrated in FIG. 8, the resulting error is very small.

Figure 9:
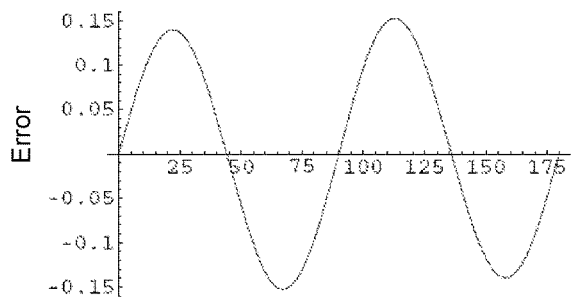
FIG. 9 illustrates angle error for the averaged sensed angles as in FIG. 8 with a positioning error.

This very high accuracy, however, is valid if both sensors 120, 122 are precisely placed at their optimum reading radiuses. In reality, there is typically some positioning error due to position tolerances. If the first and second 120, 122 are placed on a common semiconductor die (2 mm apart in the embodiment described above), their relative position remains relatively accurate, maintaining a high degree of accuracy even with some positioning error. For example, FIG. 9 illustrates angle error for the averaged sensed angles with a 0.2 mm positioning error (rr1=7.0 mm and rr2=9.0 mm).

Since the system uses differential measurements (the final angle is computed by subtracting the angles detected by the first and second sensors 120, 122), it is less susceptible to errors resulting from extraneous magnetic fields. A background magnetic field superimposed on the system would typically be homogeneous, so the first and second sensors 120, 122 would see the same field. If the field strength on the sensors 120, 122 stemming from the magnet 110 is also equal, the background field would add a small delta-angle to both sensors, which would cancel due to the subtraction.

Figure 10:
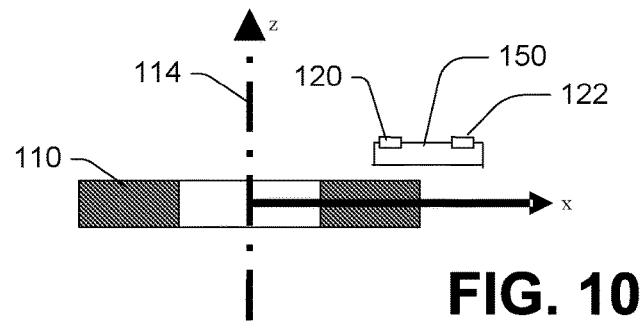
FIG. 10 illustrates an embodiment of an angle sensor where magnetic sensors are parallel to the magnet x-axis.

FIG. 10 illustrates an embodiment where the first and second magnetic sensors 120, 122 are on a common semiconductor die 150 and thus lie on a common plane. If the plane upon which the sensors 120, 122 are situated is parallel to the "top" plane of the magnet 110 (the plane generally parallel to the x-axis or perpendicular to the axis of rotation 114) as illustrated in FIG. 10, the magnetic field received by the first sensor 120 would be larger than the field received by the second sensor 122. In this case, angle errors due to background fields may not be completely cancelled, though they would likely be significantly reduced.

Figure 11:
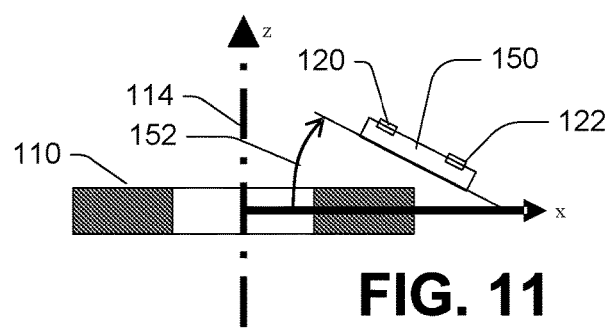
FIG. 11 illustrates an embodiment of an angle sensor where magnetic sensors are tilted with respect to the magnet x-axis.

FIG. 11 illustrates another embodiment where the sensor die 150 is tilted out of the xy-plane as indicated by the arrow 152. The tilt 152 increases the distance of the first sensor 120 from the magnet 110, which reduces the magnetic field strength on the first sensor 120. The optimum tilt is such that the field of the magnet 110 is equally strong on both sensors 120, 122, thus cancelling errors due to a background magnetic field.

Figure 12:
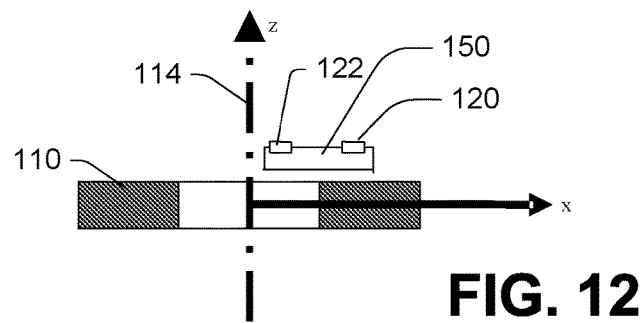
FIG. 12 illustrates an embodiment of an angle sensor where one magnetic sensor is situated inside a ring magnet's inner radius.

FIG. 12 illustrates an embodiment where the sensor geometry is inverted. The first sensor 120 remains within the annulus of the magnet 110 and the second sensor 122 remains outside the annulus; however, the second sensor 122 in FIG. 12 is situated inside the inner radius 116, such that rr2 is now less than the inner radius 116. Such an embodiment is particularly useful, for example, when large magnetic rings are employed or when there is little or no space for the sensors available outside the outer perimeter of the magnet.

In some embodiments, multiple first sensors 120 are situated within the annulus of the magnet 110 and corresponding second sensors 122 are situated outside the annulus. In such embodiments, the detected angles of the first sensors 120 are subtracted from the detected angles of the corresponding second sensors 122.

In the illustrated embodiments, the ring magnet 110 has a generally rectangular cross section. Other embodiments are envisioned where the magnet 110 has other cross sections, such as circles, ellipses, triangles, irregular polygons, etc. The cross section shape may change the optimum reading radiuses rr1, rr2 and the magnetic field strength on both sensors 120, 122. An optimum cross section shape makes the fields on both sensors 120, 122 equal in magnitude, eliminating the need to tilt the sensor die 150 as illustrated in FIG. 11.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. An angle sensor, comprising:
a ring magnet adapted to be attached to a rotatable shaft, the ring magnet having an axis of rotation and an inner radius and an outer radius extending from the axis of rotation to define an annulus, the ring magnet having a homogeneous magnetization in a first direction that is oriented perpendicular to the axis of rotation;
a first magnetic sensor positioned proximate the ring magnet at a first distance from the axis of rotation to measure magnetic field lines generated by the homogeneous magnetization of the ring magnet in the first direction, wherein the first distance is greater than the inner radius and less than the outer radius; and
a second magnetic sensor positioned proximate the ring magnet at a second distance from the axis of rotation to measure magnetic field lines generated by the homogeneous magnetization of the ring magnet in the first direction, wherein the second distance is greater than the outer radius or less than the inner radius, the second distance different from the first distance so that the first and second magnetic sensors are disposed at different distances from the axis of rotation;
wherein the first and second magnetic sensors are positioned along a same radius from the axis of rotation, wherein the first magnetic sensor is situated entirely between the inner radius and outer radius, and wherein the second magnetic sensor is situated either entirely beyond the outer radius or entirely less than the inner radius, the magnetic field lines at the first distance at a same angle to the first magnetic sensor such that the first magnetic sensor measures a negative angle of rotation of the shaft, and the magnetic field lines at the second distance at a same angle to the second magnetic sensor such that the second magnetic sensor measures a positive angle of rotation of the shaft;
a processing device configured to receive a first output signal from the first magnetic sensor and a second output signal from the second magnetic sensor and determine an angular position of the ring magnet by subtracting the second output signal from the first output signal and dividing the result by two.

2. The angle sensor of claim 1, wherein the first and second magnetic sensors are on a common semiconductor die, with the first and second magnetic sensors being spaced apart by a difference between the second distance and the first distance.

3. The angle sensor of claim 1, wherein the second distance from the axis of rotation is greater than the outer radius.

4. The angle sensor of claim 1, wherein the second distance from the axis of rotation is less than the inner radius.

5. The angle sensor of claim 1, wherein the ring magnet includes a surface defining a first plane that is perpendicular to the axis of rotation, and wherein the first and second magnetic sensors lie on a second plane that is parallel to the first plane.

6. The angle sensor of claim 1, wherein the ring magnet includes a surface defining a first plane that is perpendicular to the axis of rotation, and wherein the first and second magnetic sensors lie on a second plane that is tilted with respect to the first plane.

7. The angle sensor of claim 1, wherein the ring magnet has a rectangular cross section.

8. A method of determining angular position, comprising:
rotating a ring magnet, the ring magnet having an axis of rotation and an inner radius and an outer radius extending from the axis of rotation to define an annulus, the ring magnet having a homogeneous magnetization in a first direction that is oriented perpendicular to the axis of rotation;

sensing magnetic field lines generated by the homogeneous magnetization of the ring magnet in the first direction from the axis of rotation at a first location entirely between the inner radius and the outer radius;

sensing magnetic field lines generated by the homogeneous magnetization of the ring magnet in the first direction from the axis of rotation at a second location entirely beyond the outer radius or entirely less than the inner radius, the second location being different from the first location so that magnetic field lines are sensed at different distances from the axis of rotation, wherein the first and second locations are along a same radius from the axis of rotation;

determining the angular position of the ring magnet by subtracting the magnetic field lines sensed at the second location from the magnetic field lines sensed at the first location and dividing the result by two, wherein the magnetic field lines sensed at the second location are indicative of a positive angle of rotation of the ring magnet and the magnetic field lines sensed at the first location indicative of a negative angle of rotation of the ring magnet.

9. The method of claim 8, wherein the second location is entirely beyond the outer radius.

10. The method of claim 8, wherein the second location is entirely less than the inner radius.

11. The method of claim 8, wherein the rotating the magnet includes rotating a shaft to which the magnet is attached.

\* \* \* \* \*